United States Patent Office 3,814,728
Patented June 4, 1974

3,814,728
STABILIZATION OF POLYAMIDE
Carlton Ray Bostic, Hixson, and John Maxwell Davis, Signal Mountain, Tenn., assignors to E. I. du Pont de Nemours and Company, Wilmington, Del.
No Drawing. Continuation-in-part of application Ser. No. 197,920, Nov. 11, 1971, which is a continuation of application Ser. No. 74,871, Sept. 23, 1970, which in turn is a continuation-in-part of application Ser. No. 714,444, Mar. 2, 1968, all now abandoned. This application May 19, 1972, Ser. No. 255,199
Int. Cl. C08g 51/62
U.S. Cl. 260—45.75 C         10 Claims

ABSTRACT OF THE DISCLOSURE

A process for minimizing thermal degradation of fiber forming polyamide in the molten state.

CROSS REFERENCE TO RELATED APPLICATIONS

This application is a continuation-in-part of our copending application Ser. No. 197,920, filed Nov. 11, 1971, now abandoned which is a continuation of application Ser. No. 74,871, filed Sept. 23, 1970, now abandoned, which is a continuation-in-part of application Ser. No. 714,444, filed Mar. 2, 1968, now abandoned.

DETAILED DESCRIPTION OF THE INVENTION

The oxidative stabilization of polyamides is described in Stamatoff, U.S. 2,705,227 and involves the use of a combination of a copper compound and an inorganic halide and, optionally, a phosphorus compound. Although these compositions show a resistance to atmospheric degradation, they tend to produce a decrease in thermal stability of the polymer in the molten state. Thermal degradation reactions may lead to an increase in the gelation rate of the composition and polymer gel may collect on the surfaces of the reacting vessel necessitating periodic removal from service for cleaning of the equipment. Gelation is more fully described in Zimmeman, U.S. 2,951,777, which points out that gelation is a sequence of reactions which may begin with decarboxylation followed by branching or cross-linking. Other degradation products may not lead to a gel problem but rather to a loss in polymer viscosity.

This invention provides a high molecular weight polyamide that is stabilized against atmospheric degradation. As a result of the invention thermal degradation of the polymer is minimized in the molten state. In one process for preparing the high molecular weight polyamide there is introduced into a polyamide-forming composition, between about 0.001% to 0.03%, calculated as metallic copper of a soluble cupric salt, and from about 0.01% to 5% of an alkali metal halide, the percentages being based on the weight of the polyamide to be produced, and an alkali metal saturated aliphatic or aromatic hydrocarbon dicarboxylate, in a molar amount that is at least twice that of the cupric salt. The mixture is then polymerized with the application of heat. In another process for carrying out the invention there is introduced from about 0.01% to 5% of an alkali metal halide and between about 0.001% to 0.03% calculated as metallic copper, based on the weight of the polyamide to be produced, of a complex salt of the group of alkali metal bisoxalatocuprate and alkali metal bismalonatocuprate and the mixture is then polymerized with the application of heat.

The polyamide may be prepared using at least one dicarboxylic acid and at least one diamine, an aminocarboxylic acid or mixtures thereof. Preferably the polyamide-forming composition comprises a dicarboxylate salt with substantially equimolar amounts of amine and acid groups such as provided by, for example, hexamethylenediammonium adipate. When desired, conventional additive materials such as delusterants and the like may be present.

The alkali metal salt of the dicarboxylic acid may be preformed and introduced as such into the polyamide-forming composition. Alternatively the precursors thereof may be intoduced, e.g., by adding a strong base such as an alkali metal hydroxide, e.g., KOH or other easily neutralized base to the polyamide-forming composition so that a salt is formed with an acid component of the polyamide-forming composition. Use of the term "alkali metal dicarboxylate" herein is intended to encompass either practice. If desired, an excess amount of acid component may be present. Alkali metal carboxylates (e.g., sodium or potassium formate) that decompose to form carbon dioxide and a base can also be used in the practice of this invention to provide the strong base. As examples of suitable dicarboxylate salts there may be mentioned potassium oxalate, potassium isophthalate, potassium adipate and the like.

Suitable cupric salts are disclosed in the aforementioned Stamatoff patent and comprise those cupric salts which are soluble in the molten polymer. These include cupric bromide, and cupric acetate, among others. The amount of cupric salt to be added to the polyamide-forming mix, should be sufficient to provide a copper content calculated as percent of metallic copper by weight of the polyamide to be produced, of from 0.001% to 0.03%.

If desired, there may be added a complex salt containing cupric copper, alkali metal ions and dicarboxylate groups. Such complexes are selected from the group of alkali metal bisoxalatocuprates and bismalonatocuprates, e.g., potassium bisoxalatocuprate. The proportions to be added should be sufficient to provide from 0.001% to 0.03% calculated as metallic copper based on the weight of the polyamide to be produced.

The molar amount of the alkali metal dicarboxylate to be added should be at least twice that of the cupric salt. Preferably the ratio of alkali metal carboxylate salt groups to that of the cupric salt should not be so great as to reduce, to an undesirable degree, the ultimate molecular weight that can be achieved.

The alkali metal halide will be employed in such an amount as necessary to provide an excess of halogen over that necessary to satisfy the cupric ions of the copper salt. The halide compound to be added will generally range from about 0.01% to 5% based on the weight of the polyamide to be produced.

It is also desirable to use a phosphorus compound, as disclosed in Stamatoff, U.S. 2,705,227, in the practice of this invention. Preferred compounds are aryl phosphorus compounds such as the aryl phosphinates and phosphonates, e.g., potassium and sodium phenylphosphinates, and certain mixtures of aryl phosphorus acids and their salts such as mixtures of phenyl-phosphonic acid and potassium phenylphosphonate.

The instant invention is useful in inhibiting thermally induced reactions which lead to loss of reactive end groups (e.g., decarboxylation) or to chain scission. Both of these reactions lead to polymer of reduced molecular weight, and in some instances (e.g., with adipamide polymers) gel precursors may be formed. Formation of these undesirable degradation products frequently may be detected by infrared or ultraviolet absorption spectra or by other analytical techniques.

The tendency of the polymer to develop a gel structure or conversely its gel resistance may be determined by holding the polymer in a molten state under an oxygen-free atmosphere and measuring its viscosity continuously or at frequent intervals until a sharp rise in the viscosity is noted. At this point, a gel structure is indicated and the time required for this gel structure to develop is an indication of the gel resistance of the polymer. The technique employed herein for measuring polyamide gelation rates in the melt entails continuously measuring the electrical power required to rotate at a constant speed a probe immersed in the polymer melt at about 292° C. under one atmosphere of steam. To make this measurement, a stainless steel vessel [3½″ tall, 2½″ diameter] containing the polymer sample is heated externally and blanketed under a sweep of superheated steam, passed into the vessel at 3–5 p.s.i.g. and exiting therefrom at atmospheric pressure. The viscometer probe constituted by a ¼″ diameter stem bearing a 1¼″ diameter cylinder that is 1½″ long, enters the vessel through a bushing in the vessel lid and is immersed in the polymer melt [about ⅔″ from the vessel bottom]. A constant voltage electric motor [Gerald K. Heller Company, Model 2T 60–30 Motor] is operated at 32 volts to yield a probe speed of about 21 r.p.m. The current required to maintain this r.p.m. at constant voltage is continuously measured and recorded [current v. heating time] with a recording ammeter. The required power remains essentially constant until gelation begins, at which time it increases rapidly thus providing a direct reflection of the marked transition which accompanies polymer gelation. In a typical plot of current v. heating time, the current will more than double in a one hour period after gelation begins whereas it remained essentially constant up to this point in time which is generally in excess of 10 hours. The time required to reach the point of sharp current rise is taken as the gel time of the polymer. An increase in gel time may be related to an extended period of time that a spinning apparatus can be operated before it becomes necessary to shut down the apparatus for cleaning.

EXAMPLE 1

Potassium bisoxalatocuprate is prepared by neutralizing to a pH of 7, 0.10 mole of oxalic acid with potassium hydroxide and then adding 0.04 mole of cupric nitrate in an aqueous solution. A blue precipitate of potassium bisoxalatocuprate is formed, and is filtered, recrystallized from ice water and washed with ice water.

A stainless steel autoclave is purged of air, filled with nitrogen and charged with an aqueous solution of hexamethylenediammonium adipate. Aqueous solutions of acetic acid and potassium bisoxalatocuprate prepared as described above are separately injected into the autoclave. The amounts added are sufficient to provide 0.098% by weight of acetic acid and 0.0025% copper based on the weight of the polymer. The autoclave is heated and when the temperature of the polymerization mixture reaches 190° C. an aqueous solution of potassium iodide is injected into the autoclave to provide 0.10% by weight of potassium iodide based on the weight of polymer. Heating is continued until a temperature of 243° C. is reached while the pressure is maintained at 250 p.s.i.g. by permitting steam to escape. Over a period of 80 minutes, the pressure is gradually reduced from 250 p.s.i.g. to atmospheric pressure while the temperature rises from 243° C. to 270° C. The polymerization cycle is completed by holding for approximately 15 minutes at atmospheric pressure before the autoclave is discharged and the molten polymer quenched and cut into pieces suitable for melt spinning. The polyhexamethylene adipamide flake having a relative viscosity of 36 is melted in a steam atmosphere in a manner disclosed by Waltz in U.S. Pat. 2,571,975 and is spun and drawn into a 200-denier, 20-filament yarn. The gel time of the polymer used to make the yarn is determined by the method described above and found to be 16.4 hours.

A control yarn is prepared by purging a stainless steel autoclave with nitrogen and charging the autoclave with an aqueous solution of hexamethylenediammonium adipate. After heating has begun an aqueous solution of 0.098% by weight of acetic acid and 0.010% by weight of copper acetate (to provide 0.0032% Cu based on the weight of the polymer) is injected. At 190° C. 0.10% potassium iodide is added as above. Heating of the autoclave is continued and the polymerization completed in the same manner as the polymer above. A 20-filament, 200-denier yarn is similarly prepared as described above. The heat stability of the yarn of the example and the control yarn are measured by exposing the yarn in an oven at 180° C. for 30 hours and measuring break tenacity before and after exposure. The percent of original strength retained is comparable for the yarn of the example and the control. The gel time of the control polymer is measured and found to be only 15.5 hours.

EXAMPLE 2

A stainless steel evaporator is purged of air, filled with nitrogen and charged with 82 lbs. (37 kg.) of a 49.6% aqueous solution of hexamethylenediammonium adipate. This solution is concentrated to approximately 60% by weight by evaporating at about 110° C. The concentrated solution is pumped from the evaporator into a preheated nitrogen-purged stainless steel autoclave equipped with an agitator. An aqueous solution of 8.91 grams of potassium adipate in about 300 milliliters of water is injected into the autoclave. An aqueous solution containing 3.18 grams of copper acetate monohydrate (to provide 0.0064% by weight of copper based on the polymer weight) in 300 milliliters of water is also injected into the autoclave. A third aqueous solution containing 31.8 grams of potassium iodide (to provide 0.2% by weight based on the weight of the polymer) dissolved in about 300 milliliters of water is also injected. The autoclave is heated and the solution agitated until the temperature reaches 240° C. at a pressure of 250 p.s.i.g. Over a period of about 90 minutes the pressure is gradually reduced from 250 p.s.i.g. to atmospheric pressure while the temperature rises from 240° C. to about 272° C. The polymerization cycle is completed by holding at atmospheric pressure for approximately 45 minutes before the autoclave is discharged. The molten polymer is quenched and cut into pieces suitable for melt spinnin. The polymer is found to have a relative viscosity of 49 and a gel time of 17 hours.

EXAMPLE 2—CONTROL

A control sample is prepared by purging a stainless steel evaporator in the same manner as in Example 2 and charging with 375 lbs. of a 49.6% aqueous solution of hexamethylenediammonium adipate. An aqueous solution of 145 g. of potassium iodide in about 450 milliliters of water to provide 0.2% by weight of potassium iodide based on the weight of polymer is injected into the evaporator. This solution is concentrated by evaporating at about 110° C. until the concentration is approximately 60% by weight. An aqueous solution containing 14.5 grams of copper acetate monohydrate in 450 milliliters of water to provide 0.0064% of copper based on the weight of polymer is injected into the evaporator. The concentrated solution is pumped from the evaporator into a preheated nitrogen-purged stainless steel autoclave equipped with an agitator.

The autoclave is heated and the solution agitated until the temperature reaches 240° C. at a pressure of 250 p.s.i.g. Over a period of about 90 minutes, the pressure is gradually reduced from 250 p.s.i.g. to atmospheric pressure while the temperature rises from 240° C. to about 272° C. The polymerization cycle is completed by holding for approximately 45 minutes at atmospheric pressure before the autoclave is discharged and the molten polymer quenched and cut into pieces suitable for melt spinning. The finished polymer has a relative viscosity of 57 and a gel time of 13 hours.

EXAMPLE 3–A

A stainless steel evaporator is purged of air with nitrogen and charged with 70 lbs. (31.6 kg.) of a 49.6% aqueous solution of hexamethylenediammonium adipate. An aqueous solution of 34.2 grams of potassium bromide (to provide 0.25% by weight based on the weight of the polymer) and 5.25 grams of cupric bromide (to provide 0.011% by weight of copper based on the weight of the polymer) in about 300 milliliters of water is injected into the evaporator. The aqueous solution is evaporated at about 110° C. until the concentration of the salt solution reaches about 60% by weight. An aqueous solution containing 13.04 grams of potassium oxalate monohydrate is injected into the evaporator. The molar amount of potassium oxalate added is 3× the molar amount of cupric salt. The hot concentrated salt solution is then transferred from the evaporator to the autoclave and the autoclave is heated and the solution agitated until the temperature reaches 240° C. at a pressure of 250 p.s.i.g. Over a period of about 90 minutes the pressure is gradually reduced from 250 p.s.i.g. to atmospheric pressure while the temperature rises from 240° C. to about 275° C. The polymerization cycle is completed by holding the polymer at 275° C. for 60 minutes with a flow of nitrogen above the molten surface before the autoclave is discharged and the molten polymer quenched and cut into pieces suitable for melt spinning. The polymer has a relative viscosity of 48 and a gel time of 16 hours.

EXAMPLE 3–B

A stainless steel evaporator is purged of air with nitrogen and charged with 82 lbs. (37 kg.) of a 49.6% aqueous solution of hexamethylenediammonium adipate. This solution is concentrated by evaporating at about 110° C. until the concentration is approximately 60% by weight. An aqueous solution containing 3.5 grams of cupric bromide (to provide 0.0064% copper based on the weight of the polymer) and 23.0 grams of potassium bromide (to provide 0.144% by weight based on the weight of the polymer) is injected into the hot concentrated solution in the evaporator. Another aqueous solution containing 8.0 grams potassium isophthalate in 500 milliliters of water is also injected. The molar amount of potassium isophthalate added is 2.05× the molar amount of the cupric salt. The concentrated solution is transferred by pumping from the evaporator into a preheated nitrogen purged stainless steel autoclave equipped with an agitator. The autoclave is heated and the solution agitated until the temperature reaches 240° C. at a pressure of 250 p.s.i.g. Over a period of about 90 minutes, the pressure is gradually reduced from 250 p.s.i.g. to atmospheric pressure while the temperature rises from 240° C. to about 272° C. The polymerization cycle is completed by holding for approximately 45 minutes at atmospheric pressure before the autoclave is discharged and the molten polymer quenched and cut into pieces suitable for melt spinning. The finished polymer has a relative viscosity of 46 and a gel time of 17 hours.

EXAMPLE 3—CONTROL

In the same manner as Example 3–A a control sample is prepared by purging a stainless steel autoclave with nitrogen and charging with 375 lbs. of a 49.6% aqueous solution of hexamethylenediammonium adipate. An aqueous solution of 15.95 grams of cupric bromide (to provide 0.0064% copper based on the weight of the polymer) and 104.5 grams of potassium bromide (to provide 0.144% based on the weight of the polymer) in one liter of water is injected into the evaporator. This solution is concentrated by evaporating at about 110° C. until the concentration is approximately 60% by weight. The concentrated solution is transferred by pumping from the evaporator into a preheated nitrogen-purged stainless steel autoclave equipped with an agitator. The autoclave is heated and the solution agitated until the temperature reaches 240° C. at a pressure of 250 p.s.i.g. Over a period of about 90 minutes, the pressure is gradually reduced from 250 p.s.i.g. to atmospheric pressure while the temperature rises from 240° C. to about 272° C. The polymerization cycle is completed by holding for approximately 40 minutes under a nitrogen sweep at atmospheric pressure before the autoclave is discharged and the molten polymer quenched and cut into pieces suitable for melt spinning. The finished polymer has a relative viscosity of 71 and a gel time of 12.5 hours.

EXAMPLE 4

A stainless steel evaporator is purged of air with nitrogen and charged with a sufficient amount of an aqueous solution of hexamethylenediammonium adipate to yield 2600 pounds of polymer. An aqueous solution of 3.2 pounds of adipic acid is added and the solution evaporated at a temperature of 140° C. to a concentration of approximately 60%. The concentrated solution is transferred by pumping from the evaporator to a preheated nitrogen-purged stainless steel autoclave. An aqueous solution of 434 grams of potassium bisoxalatocuprate monohydrate (to provide 0.0069% of copper based on the weight of polymer), 189 grams of potassium oxalatehydrate and 2367 grams of potassium iodide (to provide 0.2% based on the weight of polymer) are premixed and injected into the autoclave. The autoclave is heated until the temperature reaches 243° C. at a pressure of 250 p.s.i.g. by permitting steam to escape. Over a period of 80 minutes the pressure is gradually reduced from 250 p.s.i.g. to atmospheric pressure while the temperature rises to 270° C. The polymerization cycle is completed by holding for approximately 15 minutes at atmospheric pressure before the autoclave is discharged and the molten polymer quenched and cut into pieces suitable for melt spinning. The polymer has a relative viscosity of 41 and a gel time of 17.3 hours. The mole ratio of metal carboxylate to copper salt is 5.6. The polymer is screw-melted and spun and drawn into a 1260-denier, 210-filament yarn.

A control is prepared using the above-described method except that the potassium bisoxalatocuprate and the potassium oxalate are replaced with 0.02 weight percent of copper acetate to provide 0.0064% copper based on the weight of the polymer. The polymer of the control has a gel time of 15.5 hours.

EXAMPLE 5

Sodium bismalonato cuprate is prepared by neutralizing malonic acid with sodium hydroxide and then adding cupric nitrate in an aqueous solution. A precipitate of sodium bismalonato cuprate is formed which is filtered, recrystallized, refiltered and dried.

A stainless steel autoclave is purged of air, filled with nitrogen and charged with an aqueous solution of hexamethylenediammonium adipate. An aqueous solution of sodium malonato cuprate is injected into the autoclave to provide 0.0098% of copper based on the weight of polymer. A small amount of a silicone antifoam agent is added. The autoclave is heated and when the temperature of the mixture reaches 190° C., an aqueous solution containing potassium iodide is injected into the autoclave to provide 0.20% by weight of potassium iodide based on the weight of polymer. The heating is continued to a temperature of 243° C. at a pressure of 250 p.s.i.g. Over a period of 80 minutes, the pressure is gradually reduced to atmospheric pressure while the temperature is permitted to increase to 270° C. The polymerization cycle is completed by holding for approximately 15 minutes at atmospheric pressure before the autoclave is discharged and the molten polymer quenched and cut into pieces suitable for melt spinning. The polymer has gel time of 16.1 hours.

EXAMPLE 6

Two batches of polymer, A and B, differing only in being prepared using an alkali metal dicarboxylate, are prepared by the following procedure. A stainless steel evaporator is charged with 8884 g. of 1,12-dodecanedioic acid, 8120 g. bis(4-aminocyclohexyl)methane (PACM diamine) of 95% trans-trans isomer and water to give a 40% solution. The salt-water mixture is heated to 140° C. (at about 70 p.s.i.g.) to complete solution and the pH is adjusted to 8.040. The solution is then concentrated to 50% salt (by evaporation) and transferred to the autoclave. The temperature and pressure are then increased to 240° C., and 400 p.s.i.g. and the remaining water allowed to bleed off while holding the 400 p.s.i.g. pressure. The additives dissolved in water (Table I—provides 0.0033% copper based on the weight of the polymer) are pumped into the mixture during this heat-up period (when the batch reaches 200° C.). Agitation is started when the vessel reaches 400 p.s.i.g. Upon completion of the evaporation in the autoclave, the temperature of the mixture is raised to 325° C. and then maintained at this temperature throughout the remainder of the cycle. When the batch temperature reaches 315° C., the pressure is slowly reduced to atmospheric over a 90 minute period. The batch is then held at atmospheric pressure for 45 minutes, extruded and rapidly quenched in water and cut into flake of suitable size for use in a spinning unit screw melter. The antioxidant used in each batch, and the properties of the polymer are given in Table I. The polymer prepared in this step is termed, for convenience, PACM-12.

TABLE I

| Batch | A (test) | B (control) |
|---|---|---|
| $CuBr_2$, g | 1.78 | 1.78 |
| KBr, g | 11.4 | 11.4 |
| Dicarboxylate [1] | 4.89 g. $K_2C_{12}H_{20}O_4$ | None |
| Polymer RV [2] | 42.3 | 68.7 |
| End group analysis: [3] | | |
| COOH | 65.6 | 48.9 |
| $NH_2$ | 60.0 | 46.3 |
| Cyclohexene | 4.1 | 6.3 |

[1] The "dicarboxylate" is an aqueous solution of the alkali metal dicarboxylate, and is prepared and added separately from the $CuBr_2$/KBr solution, as follows:
Two equivalents of a standard KOH solution are added to exactly neutralize 3.67 g. of 1,12-dodecanedioic acid. An additional 1% of the KOH solution is then added to completely dissolve the diacid salt. The resulting composition is added to the batch first, then the $CuBr_2$/KBr solution is added immediately afterwards. The molar amount of the dodecanedioate added is 2.0X the molar amount of cupric salt.
[2] Polymer relative viscosity (RV) is measured in a 1:1 mixture (wt. basis) of 90-100% formic acid and phenol, using a solution containing 7.4 gm. of polymer in 100 ml. of the solvent.
[3] End groups are reported as equivalents per $10^6$ gm. polymer. Amine and carboxyl determinations follow the general procedures described by J. E. Waltz and G. B. Taylor in Analytical Chem., 19, 448-450 (1947).

Thermally degraded PACM-12 in sulfuric acid solution exhibits an absorption at 298 m$\mu$, which is believed to be due to cyclohexene end groups formed as a result of thermal degradation. The intensity of this absorption is a quantitative measure of concentration of these species and hence of the extent of thermal degradation in the polymer.

These two polymers A and B are placed in a column and solid-phase polymerized at 222° C. under steam. The resulting polymers are dried in a vacuum oven at 110° C. for 48 hours.

These solid-phase polymerized polymers are then melt-spun into yarn under identical conditions (330° C., 30 minutes hold-up time). Results from analysis are given in Table II.

TABLE II

[Thermal degradation during spinning]

| Polymer | A (test) | B (control) |
|---|---|---|
| Solid-phase polymerized: | | |
| RV | 302 | 291 |
| Cyclohexene | 3.2 | 4.9 |
| Spun yarn: RV | 193 | 80.5 |
| RV loss | 109 | 210.5 |
| Cyclohexene | 11.2 | 28.7 |
| Cyclohexene increase | 8.0 | 23.8 |

Thermal degradation during spinning of the B control PACM-12 polymer results in the formation of 24 cyclohexene ends and a loss of 210 RV units. Only 8 cyclohexene ends are formed with the A test polymer and the RV loss is reduced to 109 units.

EXAMPLE 7

This example shows decreased degradation of the test polymer of Example 6 using a laboratory test.

Samples of polymer A and B from Example 6 are placed side-by-side in sealed vessels, purged of air, and heated for 30 minutes to the molten state at 335° C. under steam. Vacuum (about 15 mm. Hg) is then applied and the samples held under these conditions for a specified period of time. The polymers are then rapidly quenched and analyzed; the results are given in Table III.

TABLE III

| | Property tested | | | |
|---|---|---|---|---|
| | RV | | Cyclohexene | |
| Polymer conditions | A | B | A | B |
| 30 min. steam plus— | | | | |
| 0 min. vacuum | 54.2 | 66.6 | 6.0 | 8.6 |
| 30 min. vacuum | 120 | 75.9 | 8.7 | 15.8 |
| 60 min. vacuum | 142 | 58.9 | 12.1 | 25.4 |

While the invention has been specifically illustrated with the preparation of polyhexamethylene adipamide and poly(methylene-di-1-,4-cyclohexylene dodecanediamide), it is in general applicable to the preparation of synthetic linear polyamides. Suitable polyamides are described in the previously mentioned Stamatoff patent.

What is claimed is:

1. A high molecular weight synthetic linear polyamide having carbonamide radicals as recurring and integral parts of the polymer chain prepared by introducing into a polyamide-forming composition, between about 0.001% to 0.03%, calculated as metallic copper, of a soluble cupric salt, and from about 0.01% to 5% of an alkali metal halide, the percentages being based on the weight of the polyamide to be produced, and an alkali metal dicarboxylate of a saturated aliphatic or aromatic hydrocarbyl dicarboxylic acid in a molar amount that is at least twice that of the cupric salt, and polymerizing said composition with the application of heat.

2. The product of claim 1 wherein the alkali metal dicarboxylate is potassium oxalate.

3. The product of claim 1 wherein the alkali metal dicarboxylate is potassium adipate.

4. The product of claim 1 wherein the alkali metal dicarboxylate is potassium isophthalate.

5. The product of claim 1 wherein the alkali metal halide is potassium bromide.

6. The product of claim 1 wherein the alkali metal halide is potassium iodide.

7. The product of claim 1 wherein the cupric salt is cupric acetate.

8. The product of claim 1 wherein the cupric salt is cupric bromide.

9. A high molecular weight synthetic linear polyamide having carbonamide radicals as recurring and integral parts of the polymer chain prepared by introducing into a polyamide-forming composition, between about 0.001% to 0.03% calculated as metallic copper, of an alkali metal bisoxalatocuprate or bismalanotocuprate, and from about 0.01% to 5% of an alkali metal halide, the percentages being based on the weight of the polyamide to be produced, and polymerizing said composition with the application of heat.

10. The product of claim 9 wherein the complex salt is potassium bisoxalatocuprate.

(References on following page)

References Cited

UNITED STATES PATENTS

| | | | |
|---|---|---|---|
| 3,280,053 | 10/1966 | Twilley et al. | 260—45.75 |
| 2,951,777 | 9/1960 | Zimmerman | 260—78 |
| 2,919,258 | 12/1959 | Pietrusza et al. | 260—37 |
| 2,705,227 | 3/1955 | Stamatoff | 260—45.7 |
| 2,846,332 | 8/1958 | Nesty | 260—45.75 |
| 3,228,849 | 1/1966 | Illing et al. | 260—18 |

OTHER REFERENCES

Thermal Degradation of Polymers—S.C.I. Monograph, No. 13, pp. 357 to 391, 1961. Society of Chemical Industry, London, England, U.S. Patent Office Library, No. 56 p. 6S57.

DONALD E. CZAJA, Primary Examiner

V. P. HOKE, Assistant Examiner

U.S. Cl. X.R.

260—45.7 R, 45.85 T